United States Patent [19]
Balogh

[11] Patent Number: 5,894,212
[45] Date of Patent: Apr. 13, 1999

[54] DISCHARGE MONITORING AND ISOLATING SYSTEM FOR BATTERIES

[75] Inventor: André A. Balogh, Oxford, Conn.

[73] Assignee: Tarrytown Consulting, Inc., Tarrytown, N.Y.

[21] Appl. No.: 08/934,480

[22] Filed: Sep. 19, 1997

[51] Int. Cl.$^6$ .......................... H02J 7/00; G01N 27/416
[52] U.S. Cl. .................. 320/122; 320/126; 320/136; 320/134; 320/116; 324/433; 324/434
[58] Field of Search .................... 320/116, 118, 320/120, 121, 122, 127–135, 136, 126, 112, 117, 119; 324/434, 433, 429; 307/46, 48, 49, 50; 429/90–93

[56] References Cited

U.S. PATENT DOCUMENTS

| | | | |
|---|---|---|---|
| 4,061,955 | 12/1977 | Thomas et al. | 320/122 |
| 4,217,645 | 8/1980 | Barry et al. | 320/116 |
| 4,484,140 | 11/1984 | Dieu . | |
| 4,536,695 | 8/1985 | Lin . | |
| 4,616,170 | 10/1986 | Urstoger | 320/131 |
| 4,622,508 | 11/1986 | Matteau et al. | 320/136 |
| 4,871,956 | 10/1989 | Barrella . | |
| 5,130,633 | 7/1992 | Maruichi . | |
| 5,153,496 | 10/1992 | LaForge . | |
| 5,179,337 | 1/1993 | Staarman et al. . | |
| 5,206,578 | 4/1993 | Nor | 320/134 |
| 5,258,244 | 11/1993 | Hall et al. . | |
| 5,304,915 | 4/1994 | Sanpei et al. . | |
| 5,422,558 | 6/1995 | Stewart | 320/136 |
| 5,493,197 | 2/1996 | Eguchi et al. . | |
| 5,530,336 | 6/1996 | Eguchi et al. . | |
| 5,543,245 | 8/1996 | Andrieu et al. | 324/434 |
| 5,576,612 | 11/1996 | Garrett et al. . | |
| 5,581,170 | 12/1996 | Mammano et al. . | |
| 5,602,481 | 2/1997 | Fukuyama | 324/434 |
| 5,610,495 | 3/1997 | Yee et al. | 320/116 |
| 5,652,501 | 7/1997 | McClure et al. | 320/134 |
| 5,656,915 | 8/1997 | Eaves | 320/120 |
| 5,705,929 | 1/1998 | Caravello et al. | 324/434 |
| 5,710,503 | 1/1998 | Sideris et al. | 320/116 |

Primary Examiner—Peter S. Wong
Assistant Examiner—K. Shin
Attorney, Agent, or Firm—Darby & Darby

[57] ABSTRACT

A battery-cell protection system includes a processor, a wake-up circuit, and a shunt or isolation switch. The processor responds to voltages from cells in a battery by detecting any of the voltages being less than or equal to a predetermined threshold voltage. The processor samples cell voltages at a fast sampling rate and compares the sampled voltages to a predetermined threshold value. The processor further identifies any cell having an associated voltage that is less than or equal to the predetermined threshold voltage. The wake-up circuit responds to a current load from the battery by activating the processor. The shunt switch responds to the identification of the cell by selectively electrically shunting the identified cell to allow the other cells of the battery to continue to supply power to a connected load. The monitoring and identification of cells are performed in parallel to rapidly monitor all of the cells at once. In addition, the monitoring of the cells adaptive in modifying the sampling rate for improved detection and isolation of discharged cells. The processor may further include appropriate memory for recording information, such as total load current, which may later be used as a battery-usage clock to determine the "age" and remaining "life" of the battery.

20 Claims, 1 Drawing Sheet

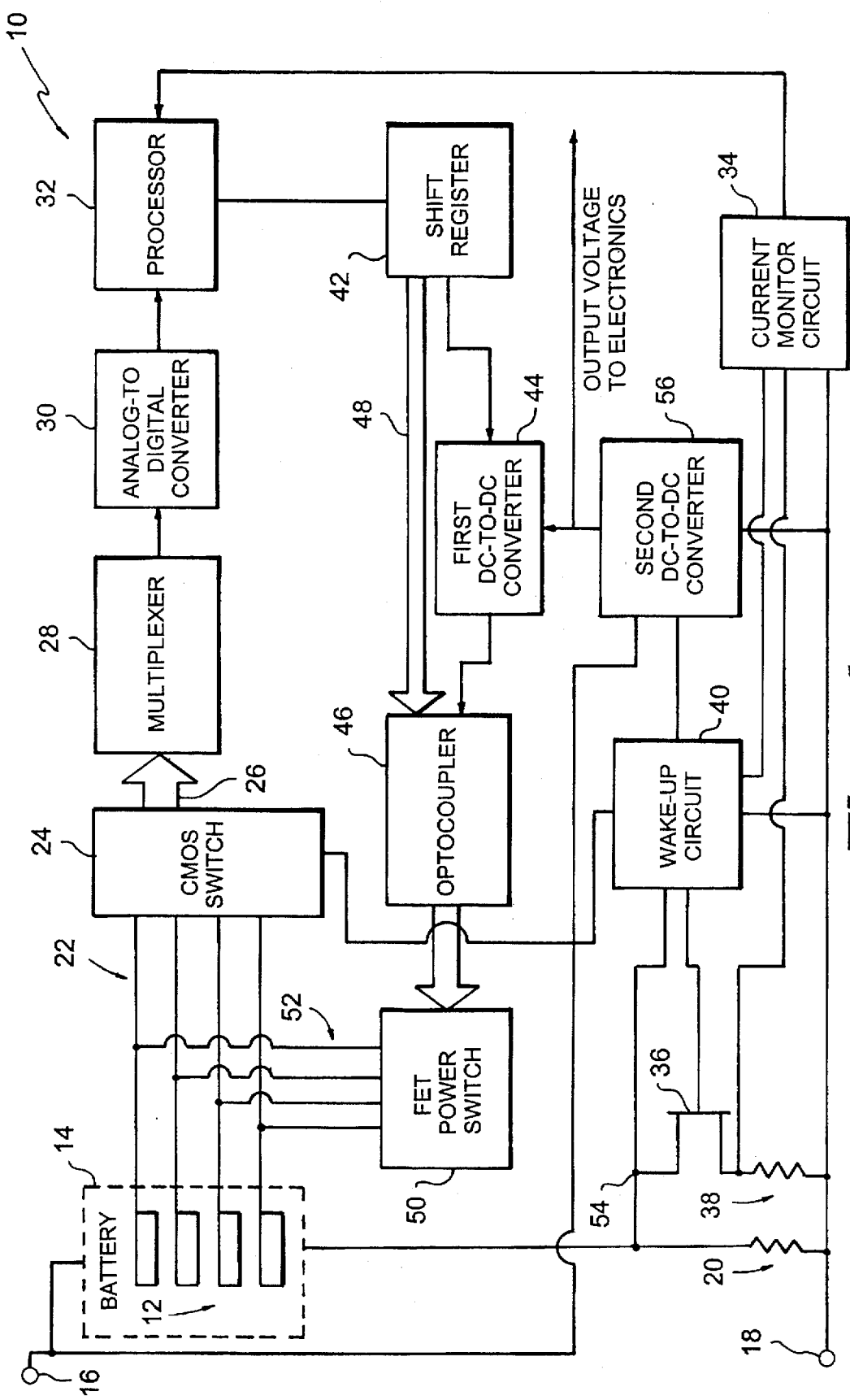

DISCHARGE MONITORING AND ISOLATING SYSTEM FOR BATTERIES

BACKGROUND OF THE INVENTION

1. Field of the Invention

This disclosure relates generally to energy storage devices (e.g., batteries), and in particular, to a system for monitoring and controlling the discharge cycle of the cells in a battery.

2. Description of Related Art

Circuits are known in the art for monitoring the condition of batteries and their cells. Such known circuits measure the voltage, the current and discharge cycle of the batteries and use this information to determine the status of the battery as a whole, or any particular battery cell.

In multi-cell batteries, a low-capacity cell will typically discharge more rapidly than the other cells, causing that particular cell to "reverse charge". Once a cell becomes reverse charged (i.e., forced below 0 volts by adjacent, electrically connected cells, during a discharge cycle), the cell becomes permanently damaged and will develop poor recharging characteristics. In prior art batteries, once a cell becomes reverse charged, the damaged cell will affect the operating characteristics of the entire battery. The damaged battery will have lower capacity and will become discharged more rapidly than a healthy battery.

It would be desirable to manufacture a battery with cells that are "matched", having similar charging and discharging characteristics. Although, a battery mate up of matched cells will typically outperform unmatched batteries, the cell-matching process is difficult to implement cost effectively and is rarely performed, most commercially available batteries are made from unmatched cells and therefore perform somewhat unpredictably. Furthermore, in such matched-cell batteries, the charging and discharging characteristics of each cell will change differently each time the battery is charged and discharged so that over a period of time, such matched cells will invariably become unmatched.

In an unmatched battery, each cell will operate with its own particular charging and discharging characteristics, and one of the cells wig inherently have poorer operating characteristics (e.g., will not hold a high charge and will rapidly discharge) than the others. This low-capacity cell will typically be the first one to discharge as the battery supplies power to a connected load. Once the low-capacity cell becomes fully discharged, it will be drawn ino a reverse charge condition and will become damaged. The effective output of the battery as a whole is dictated by the effective output of the low-capacity cell. When the low-capacity cell becomes discharged, the outlet voltage of the remaining "good" cells is reduced by the reversed charged voltage of the low-capacity cell and the battery, as a whole, rapidly fails.

Devices in the prior art are capable of detecting failing cells and responding to protect the remaining cells of a battery. For example, U.S. Pat. No. 5,258,244 measures voltage differences across individual cells using internal impedances of each cell. Failing cells, as determined by an increase in their internal impedance, may be isolated from the other cells. U.S. Pat. No. 4,871,956 monitors the condition of cells by sequentially sampling the voltage of each cell and comparing the sampled cell voltage with a reference voltage to generate voltage differences which are stored in a shift register for each cell. If the voltage difference is sufficiently high, the cell is isolated from the other cells.

The selective identification and isolation of discharging cells in the prior art has distinguished defective cells from healthy cells, and so has not treated both defective and healthy cells for common monitoring and protection.

It is a first object of the invention to provide a battery monitoring/controlling circuit that monitors each cell of a battery and isolates any cell whose charge reaches a predetermined threshold voltage without affecting the operation of any adjacent cell.

It is another object of the invention to provide such a battery monitoring/controlling which overcomes the deficiencies of the prior art.

It is another object of the invention to provide such a battery monitoring/controlling circuit that allows each cell of a battery to operate independent of the other cells.

SUMMARY OF THE INVENTION

According to the invention, by identifying and isolating low-capacity cell and/or discharged cells of a multi-cell battery, the operation of the battery is improved and damage to the battery caused by reverse charging of defective and/or discharged cells is prevented.

A battery cell protection system includes a processor, a wake-up circuit, and a shunt or isolation switch. The processor responds to voltages from the cells in a battery by detecting when any of the voltages is less than or equal to a predetermined threshold voltage. Samples of the cell voltages are obtained at a fast sampling rate and are compared to a predetermined threshold value. Any cell having an associated voltage at or below the predetermined threshold voltage is identified (hereinafter called a "low-capacity cell"). The wake-up circuit responds to a current load from the battery by activating the processor. The shunt switch responds to the identification of the poor cell by selectivity electrically shorting-out the identified low-capacity cell. This electrical short prevents the battery voltage obtained from the "healthy cells" from being reduced by the reverse voltage created by the reverse charging of the low-capacity cell. Ideally, this short would have a resistance of zero so that the short itself does not create a voltage drop (depending on the load current passing through the short) which to would effectively reduce the output voltage of the healthy cells. This shorting out of any low-capacity cells allows the good cells to continue to discharge their stored power to the connected load without any adverse effects caused by the low-capacity cell.

As each of the good cells discharges to the point that they become a low-capacity cell (below the predetermined threshold voltage value), they will be similarly "removed" (through shunting or shorting out) from the battery output circuit. With the present invention, a battery will continue to supply a current to a connected load until each cell of the battery has discharged below a predetermined threshold voltage.

Since all cells of a battery, according to the invention, are discharged only to a safe positive threshold voltage (or 0 volts), no cell will become reverse charged and no damage is inflicted to the remaining battery pack.

Monitoring and identification of the cells are performed in a multiplex fashion, rapidly monitoring all of the cells of the battery. In addition, monitoring of the cells is adaptive in modifying the sampling rate, in response to the measured load, for improved detection and isolation of discharged cells to prevent reverse discharging, so that at a high "C" load rate (i.e., rate of current drain from the battery) the sampling rate of the cells will be made faster than at low "C" rate conditions.

According to the invention, each cell of a battery is allowed to operate independent of the adjacent cells and each cell will be shunted from the output circuit of the battery when the particular cell drops below a threshold voltage. Therefore, the battery of the present invention may be made up of different size cells, each having completely different storage capacities, charging and discharging characteristics.

According to another aspect of the invention, the processor is used to measure and keep track of the total load current from the battery which may be use to determine the number of discharge (and/or charging) cycles the battery has undergone at any given time, functioning as a battery-usage clock or meter. This may be useful information to determine actual battery usage and thereby answer inquiries regarding the current "life" remaining of any particular used battery.

BRIEF DESCRIPTION OF THE DRAWINGS

The features and advantages of the disclosed battery cell protection system and method are explained with reference to the following detailed description of the preferred embodiment of the present invention, taken in conjunction with the accompanying drawing, in which:

FIG. 1 is a schematic of a battery cell protection system according to the invention.

DESCRIPTION OF THE PREFERRED EMBODIMENT

As shown in the FIGURE, a battery-cell protection system 10 monitors each one of cells 12 of a multi-cell battery 14, monitors the discharge cycle of each of cells 12 to measure the output voltage of each cell, and selectively isolates any cell having a measured voltage falling to or below a predetermined threshold value. Any isolated low-capacity cell is prevented from adversely affecting the operation of the remaining "good" cells 12 of battery 14.

Battery cell protection system 10 may be incorporated within multi-cell battery 14, which may be any type of battery, such as rechargeable NiCad batteries. Alternatively, battery-cell protection system 10 may be an accessory to battery 14 and/or to electronics connected to battery 14, or may be incorporated with electronics or an electrically powered device, such as a radio or flashlight. Multi-cell battery 14 may be used in conjunction with an electrical devise connected at terminals 16, 18. As described in greater detail below, the electrical components of battery cell protection system 10 are all powered by battery 14, and are therefore kept off during no-load conditions to prevent battery drain. As described below, a "wake-up" circuit is used to detect a predetermined amount of load current passing through battery 14, indicating connected load. The "wake-up" circuit, in turn, activates the components of battery-cell protection system 10.

When activated, as described in detail below, battery-cell protection system 10 continually monitors each cell 12 of battery 14. If any particular cell discharges to a preset discharge threshold voltage, for example, about 0 VDC, battery-cell protection system 10 detects a "fully discharged" condition (i.e., a low-capacity cell) and automatically shorts out the low-capacity cell to effectively isolate the low-capacity cell (or cells) from the remaining good cells. In this manner, the isolated low-capacity cell (or cells) prevented any of the remaining cells in battery 14 from adversely affecting the output of battery 14. Battery-cell protection system 10 may be operated with a rechargeable battery as multi-cell battery 14. The monitoring and isolating processes of the present invention are dynamic so that during a recharging operation of battery 14, any low-capacity cell 12 previously shunted by battery-cell protection system 10 will be electrically reconnected to the adjacent cells, as long as each low-capacity cell maintains a charge above the threshold voltage. This dynamic operation enables all cells 12 to be fully recharged to their respective fully charged condition.

The voltage of each cell 12 is received in parallel through lines (or bus) 22 by a switch 24, which may be a complementary metal oxide semiconductor (CMOS) switch, for example, Model 4016 CMOS switching integrated circuit commercially available from the Motorola Company, of Phoenix, Ariz. Switch 24 effectively outputs the actually measured voltages of each cell 12 ever parallel lines (or bus) 26 to a multiplexer 28, which may be a Model 4051 multiplexer circuit commercially available from the Motorola Company, of Phoenix, Ariz. Alternatively, switch 24 may first scale the measured voltages of each cell 12 to be within a predetermined range of voltages (i.e., digitize??) acceptable as an input to multiplexer 28.

Multiplexer 28 generates a serial sequence of voltages from the parallel set of measured voltages. The serial sequence of voltages is applied to an analog-to-digital converter (ADC) 30, for example, Model 0837 ADC circuit commercially available from the Motorola Company, of Phoenix, Ariz. ADC 30 generates a corresponding digital signal or bit sequence as an input to a processor 32. Processor 32 then processes the inputted digital signals at a fast sampling rate to measure samples of the voltages of cells 12.

Processor 32 also receives a sampling-rate correction signal, described below, from a current-monitor circuit 34. Current-monitor circuit 34 monitors any current flowing from the battery 14 through an electronic switch 36 and optionally through a current limiting resistor 39. In another aspect of the present invention, processor 32 includes electronic RAM memory (not sown) to selectively store particular operating and measurement data, such as the total amount of load current passing through battery 14. This data may be later retrieved and used for example, in determining the number of charging and/or discharging cycles battery 14 has undergone at any given time (simply by dividing the total amount of load current (in amperes hours) stored in the RAM memory by ampere hours rating of the cells in battery 14.

A "wake-up" circuit 40 controls the switching of switch 36 between conductive (closed) and non-conductive (open) states. Switch 36 is preferably a semiconductor switch; for example, commercially available field effect transistors (FETs) may be used. In a preferred embodiment, switch 36 is a n-channel FET or metal oxide semiconductor FET (MOSFET), for example, a "HEX-SENSE", such as a power FET, MODEL IRCP054, commercially available from the International Rectifier Co. of El-Segumdo, Calif.

Current-monitor circuit 34 preferably further functions to measure peaks and to detect spikes in the measured current, and may further include conventional surge protection features to protect "HEX-SENSE" switch 36. In addition, current-monitor circuit 34 may also monitor for short circuits across battery terminals 16, 18, by detecting for currents exceeding a predetermined current level. When excess currents are detected, current-monitor circuit 34 generates a signal to immediately deactivate, turn off, and/or open switch 36. For example, current-monitor circuit 34 may send a signal to wake-up circuit 40, by a connection, shown in the FIGURE, to deactivate the transistor as switch 36.

Alternatively, current-monitor circuit 34 may be separate connected to switch 36 for directly deactivating switch 36. Regardless, when activated, turned off, or otherwise opened, switch 36 provides a high impedance in series with battery 14 to prevent overload of a load connected to terminals 16, 18. Under such potential-overload conditions, current-monitor circuit 34 preferably simultaneously generates a suitable warning signal to activate all appropriate alarm device (not shown), for example, an audible signal may be generated from a speaker, or a red light is generated by a light emitting diode (LED). The warning signal may warn a user of an overload condition just after connecting an electrical device to the terminals 16, 18.

In the preferred embodiment, activation of switch 36 is controlled by an input signal to a gate from wake-up circuit 40, as described below. In response to the current flowing through switch 36, the current monitor circuit 34 generates a sampling rate correction signal which is a digital signal output to processor 32. The sampling rate correction signal is a digital value indicating a current load in terms of a predetermined C_RATE value for the battery 14. Processor 32 processes the digital signals representing the voltages of cells 12 at the first sampling rate, as described above, and adaptively modifies the sampling rate in relation to the current load of battery 14. For example, if a current load measured by the sampling rate correction signal is about one-tenth the C_RATE value, processor 32 samples each cell 12 in parallel at a rate of 1 sampling of each cell 12, every second. As the current load increases to a value greater than or equal to C_RATE, processor 32 adaptively responds to the sampling rate correction signal, reflecting the increased current load, to increase the sampling rate of voltages obtained in parallel from cell 12 up to 100 samplings of each cell 12, every second, for example. Of course, any suitable sampling rate values may be used.

As illustrated in the above example, the adaptively modified sampling rate is set within the range of 1 sample per cell per second to 100 samples per cell per second. In this manner, low-capacity cells are quickly detected, and accurately monitored using a faster sampling rate, since low-capacity cells inherently have a very fast voltage drop under load relative to the remaining healthy cells. Accordingly, when a predetermined current load is detected, processor 32 enters an accelerated voltage sampling and detection mode and rapidly samples and immediately detects cells 12 that have a measured voltage at or below the predetermined threshold. Once detected, as described above, the detected low-capacity cells 12 are then shunted under the control of processor 32, as further described below.

Alternatively, according to a variation of the invention, processor 32 increases the sampling rate in relation to a voltage decrease in the voltage samples. In other words, as the lowest value of the voltage measured from cells 12 decreases, processor 32 increases the sampling rate to more accurately monitor the discharging of cells 12. Since the discharge characteristics of any cell 12 may be exponential in that the voltage of cell 12 may decrease exponentially, an associated increase in the sampling rate may also be exponential to more accurately assess the discharge of cells 12 relative to the predetermined thresholds.

In another aspect of the invention, processor 32 increases the sampling rate in a stepped manner in relation to a minimum measured voltage of all of the cells being at or below one of a set of predetermined intermediate threshold values.

Processor 32 may be a microprocessor, for example Model 6805K1 commercially available from the Motorola Company, of Phoenix, Ariz. Processor 32 responds to the digital values received from analog-to-digital converter 30 by detecting voltages at or below a predetermined threshold of, for example, about 0 VDC. As understood by those skilled in the art, processor 32 may include a comparator or other appropriate circuits for comparing the digitized voltage samples to a predetermined voltage threshold.

As described above, battery-cell protection system 10, according to the invention, detects defective cells according to their measured current load and accordingly increases the sampling rate of processor 32.

Battery-cell protection system 10, according to the invention, detects non-defective or "healthy" cells which discharge relatively slowly. To reduce the power consumed by processor 32 and other components of battery-cell protection system 10, a relatively low sampling rate of the associated voltages may be used to determine if healthy cells have a voltage lower than the threshold voltage.

Whether a cell is low-capacity (i.e., defective or failing) or healthy, once the voltage of a cell falls to or below the predetermined voltage threshold, processor 32 generates and outputs a bit sequence to be stored fin an electronic memory, which is preferably a shift register 42. The bit sequence includes multiple bits in corresponding positions indicating which cell 12 (or cells) of battery 14 is to be shunted(i.e., indicating a low-capacity cell), and which cells 12 are to be left connected to the battery terminals 16, 18 (i.e., good cells).

In an effort to conserve operation power of battery-cell protection circuit 10, the bit sequence from processor 32 to shift register 42 may also include a flag bit which may be w to a first DC-to-DC converter 44. When the flag bit is set, it causes DC-to-DC converter 44 to generate an operating voltage for an optocoupler 46, effectively turning optocoupler 46 on. In response to the operating voltage, optocoupler 46 receives the stored bit sequence from the shift register 42 via parallel lines (or bus) 48, in which each of the lines 48 corresponds to each respective cell 12, represented in the shift register 42 as a corresponding bit (lines 48 are illustrated as a single arrow in the FIGURE). Once powered optocoupler 46 activates an FET power switch 50 to selectively short out specific cells 12 using shunt lines (or bus) 52, according to the data in shift register 42 specifying which cells to shunt.

FET power switch 50 shunts a specific low capacity cell by connecting corresponding lines 22 so that the specific low capacity cell is electrically bypassed or shorted out from the remaining cells. The low capacity cells are shorted and maintained in the shorted state to prevent low capacity cells 12 from becoming reverse charged or reducing the effective output of the remaining good cells 12.

In a preferred embodiment of the invention, battery-cell protection system 10 operates only when activated by wake-up circuit 40. As described above, wake-up circuit 40 activates battery-cell protection system 10 when it detects a load current. Accordingly, battery-cell protection system 10 conserves operating power by not monitoring cells 12 or performing voltage sampling when no load is applied to the battery 14 or no current is detected.

The drawing of current through battery 14 creates a voltage drop between a node 54 and 18, with the voltage drop serving as an input voltage applied from battery 14 to wake-up circuit 40. Terminal 18 may be grounded to serve as the grounding node of battery-cell protection system 10. In response, wake-up circuit 40 generates and outputs a first activation signal to switch 24, which, in turn, transmits the voltage values of cells 12 through the multiplexer 28 and analog-to-digital converter 30 to processor 32 for sampling and comparison with a predetermined threshold. Of course, switch 24, multiplexer 28, analog-to-digital converter 30 and processor 32 may operate independent of wake-up circuit 40, and receive operating power which is not controlled by wake-up circuit 40, to monitor cells 12 for normal discharge. In such instance, wake-up circuit 40 may then be used only to detect a load current through battery 14, and may activate current monitor circuit 34 to monitor load current and adjust the sampling rate of the processor 32, accordingly. However, since battery-cell protection circuit 10 is preferably powered by battery 14, to conserve power, it is preferred that wake-up circuit 40 function as an on-switch to switch 24, multiplexer 29, ADC 30, and processor 32.

Wake-up circuit 40 also generates and outputs a second activation signal to a second DC-to-DC converter 56, which in turn receives and converts the battery voltage $V_{IN}$ to a predetermined output voltage for use by attached electronics. Accordingly, battery cell protection system 10 further serves as a conduit between battery 14 and electronics, as well as a circuit for protecting the battery 14 from reverse discharge effects.

Second DC-to-DC converter 56 may include a rectifier for converting battery voltage $V_{IN}$ to the predetermined output voltage of, for example, about 5 VDC as a standard operating voltage. The 5 VDC is also input to first DC-to-DC converter 44, which may include a transformer for generating a higher voltage to operate FET power switch 50 and optocoupler 46. The other components of battery-cell protection system 10, for example, processor 32 may also receive an operating voltage, for example, about 5 VDC, from appropriate connections to second DC-to-DC converter 56. Alternatively, the first DC-to-DC converter 44 may receive an operating voltage directly from the battery 14 or from another energy source.

First DC-to-DC converter 44 generates the higher voltage as an operating voltage for optocoupler 46. The output operating voltage of optocoupler 46 is preferably higher in magnitude than any voltage of the cells 12, to insure that FET power switch 50 may effectively shunt any selected (low capacity) cell 12. Preferably, the output operating voltage of the optocoupler 46 is to be at 10 VDC higher than the highest voltage of any of cells 12. For example, if each cell 12 outputs about 10 VDC, the output operating voltage or the optocoupler 46 if preferably between about 20 VDC to insure proper operation and gating of FET power switch 50 to shunt a selected cell via one of lines 52. In addition, optocoupler 46 is used to electrically isolate the higher voltages required of the FET power switch 50 from the other components of battery-cell protection system 10, so that relatively large voltage offsets in battery-cell protection system 10 do not adversely affect the sampled measuring of voltages from each cell 12.

As each cell 12 discharges and outputs a voltage at or below the predetermined threshold voltage, wake-up circuit 40 use available power from the remaining cells of battery 14 to continue the selective shunting of the appropriate discharged or defective cells through shift register 42, optocoupler 46, and FET power switch 50, an ensuring that FET power switch 50 maintains any shunts on lines 52.

Wake-up circuit 40 is configured to operate using very low power, and operates until the last cell 12 discharges to the threshold voltage. Once the last cell 12 is sufficiently discharged, wake-up circuit 40 becomes deactivated, which causes battery-cell protection system 10, through FET power switch 50, to release the shunts and reconnect all cells 12 in series (or otherwise). For rechargeable batteries, the release of shunts allows cells 12 to be recharged.

With removal of the shunts from cells 12 after deactivation of battery-cell protection system 10, some low-capacity cells may not be fully discharged, and will again provide a current load to generate a voltage drop at node 54. A voltage drop will again activate wake-up circuit 40 to initiate the above-described procedure for selectively shunting poor cells 12 to allow the remaining good cells to continue to supply power to a connected load.

In the preferred embodiment, the threshold voltage is about 0 VDC. This threshold voltage may be preset to any positive voltage, for example, 1 VDC. Any preset voltage higher than 0 VDC allows battery-cell protection circuit 10 to shunt any poor cell 12 prior to the cell entering a reverse charged condition.

Since battery-cell protection system 10 detects the voltages of each cell independently and acts to shunt each low-capacity cell independently, there is no requirement that cells 12 provide substantially the same output voltage. Accordingly, unmatched cells having different output voltages and different discharge cycles may be combined in a single battery 14 to form a hybrid configuration without the danger of reverse charging any of cells 12.

While the present battery-cell protection system and method are particularly shown and described with reference to the preferred embodiment, it is to be understood that various modifications in form and detail may be made without departing from the scope and spirit of the present invention. For example, battery 14 may include cells 12 of any number, for example, twenty or more cells, with a corresponding number of lines 22 and 52 being provided, one line for each cell. The length of shift register 42 is to correspond to the number of cells 12, in addition to the flag bit. Multiple shift register modules may be used to effectively form a single shift register 42. Similarly, multiple modules may form switch 24, multiplexer 28, optocoupler 46, FET power switch 50, etc. to handle the number of cells 12.

In addition, it is understood that second DC-to-DC converter 56 may generate other predetermined voltages, for example, about 3.3 VDC, as a standard voltage for associated electronics. Accordingly, suggested modifications described with examples, but not limited to the examples, are to be considered within the scope of the present invention.

What is claimed is:

1. A battery cell protection system comprising:
    a processor responsive to a plurality of voltages received in parallel from a plurality of cells in a battery for detecting any of the voltages being less than or equal to a predetermined threshold voltage, and for identifying at least one cell having an associated voltage being less than or equal to said predetermined threshold voltage; and
    an isolation switch responsive to the identification of said at least one cell for selectively electrically isolating said at least one identified cell from the other cells of the battery.

2. The battery cell protection system of claim 1 further comprising:
    a wake-up circuit responsive to a current load from the battery for activating the processor.

3. The battery cell protection system of claim 1 wherein the processor, using samples of the cell voltages obtained at a first sampling rate, compares the samples to a predetermined threshold value to detect for any of the voltages being less than or equal to the predetermined threshold voltage.

4. The battery cell protection system of clam 3 further comprising:
   a current monitor responsive to a current load from the battery for generating a sampling rate correction signal; and
   wherein the processor responsive to the sampling rate correction signal adaptively modifies the sampling to be at a second predetermined sampling rate greater than the first sampling rate, and compares samples of the cell voltages to the predetermined threshold at the second predetermined sampling rate.

5. The battery cell protection system of claim 1 further comprising:
   a current load switch for receiving current from the battery; and
   wherein the current monitor detects a current load from the current received by the current load switch.

6. The battery cell protection system of claim 5 wherein the current load switch is a n-channel metal oxide semiconductor field effect transistor.

7. The battery cell protection system of claim 1 further comprising:
   a memory for storing a bit sequence identifying any cells to be selectively isolated;
   wherein the processor generates the bit sequence from the identification of cells having voltages less than or equal to the predetermined threshold voltage.

8. The battery cell protection system of claim 7 further comprising:
   an optocoupler responsive to the bit sequence for controlling the isolation switch to selectively electrically isolate the at least one identified cell.

9. The battery cell protection system of clam 1 further comprising:
   an analog-to-digital converter for converting the plurality of voltages to a corresponding digital signal; and
   wherein the processor processes the digital signal for detecting any of the voltages corresponding to the digital signal being less than predetermined threshold voltage.

10. The battery cell protection system of claim 9 further comprising:
    a multiplexer for converting the plurality of voltages received in parallel from the plurality of cells to a serial analog voltage signal representing the plurality of voltages; and
    wherein the analog-to-digital converter processes the serial analog voltage signal to generate a serial bit sequence as the digital signal.

11. A battery cell protection system comprising:
    a processor responsive to a plurality of voltages received in parallel from a plurality of cells in a battery for detecting any of the voltages being less than or equal to a predetermined threshold voltage, using samples of the cell voltages obtained at a first sampling rate to compare the samples to a predetermined threshold value, and for identifying at least one cell having an associated voltage being less than or equal to the predetermined threshold voltage;
    a wake-up circuit responsive to a current load from the battery for activating the processor; and
    a shunt switch responsive to the identification of the at least one cell for selectively electrically shunting-out the at least one identified cell to prevent the at least one identified cell from becoming reverse charged.

12. The battery cell protection system of claim 11 further comprising:
    a current monitor responsive to a current load from the battery for generating a sampling rate correction signal; and
    wherein the processor responsive to the sampling rate correction signal adaptively modifies the sampling to be at a second predetermined sampling rate greater than the first sampling rate, and compares samples of the cell voltages to the predetermined threshold at the second predetermined sampling rate.

13. The battery cell protection system of claim 12 further comprising:
    a current load switch, including a "HEX-SENSE", a n-channel metal oxide semiconductor field effect transistor, for receiving from the battery; and
    wherein the current monitor detects a current load from the current received by the current load switch.

14. A method for protecting the cells of a multi-cell battery comprising the steps of:
    receiving in parallel a plurality of voltages from the cells;
    detecting for any of the plurality of voltages being less than or equal to a predetermined threshold voltage;
    identifying at least one cell having an associated voltage being less than or equal to the predetermined threshold voltage; and
    selectively electrically isolating the at least one identified cell from the other cells of the battery to protect the other cells.

15. The method of claim 14 further comprising the steps of:
    receiving a current from the battery associated with a current load thereof; and
    activating a processor to perform the steps of detecting and identifying.

16. The method of claim 14 wherein the step of detecting further comprises the steps of:
    sampling the plural of voltages at a first sampling rate; and
    comparing the samples to a predetermined threshold value to detect for any of the voltages being less than or equal to the predetermined threshold voltage.

17. The method of claim 16 further comprising the steps of:
    monitoring a current from the battery;
    generating a sampling rate correction signal in response to a current load associated with the current from the battery; and
    adaptively controlling the step of sampling using the sampling rate correction signal to perform the step of sampling at a second predetermined sampling rate greater than the first sampling rate.

18. The method of claim 17 wherein the step of monitoring includes the step of:
    monitoring the current using a n-channel metal oxide semiconductor field effect transistor.

19. The method of claim 14 further comprising the step of:
    storing in a memory a bit sequence identifying any cells to be selectively isolated; and
    wherein the step of identifying includes the step of generating the bit sequence from the identification of cells having voltages less than or equal to the predetermined threshold voltage.

20. The method of claim 19 comprising the steps of:
    receiving the bit sequence at an optocoupler; and
    controlling, using the optocoupler responding to the bit sequence, the step of selectively electrically isolating the at least one identified cell.

* * * * *